United States Patent

Qiu

(10) Patent No.: US 9,506,817 B2
(45) Date of Patent: Nov. 29, 2016

(54) TEMPERATURE DETECTION METHOD AND DEVICE WITH IMPROVED ACCURACY AND CONVERSION TIME

(75) Inventor: Feng Qiu, Fremont, CA (US)

(73) Assignee: INTEGRATED DEVICE TECHNOLOGY, INC, San Jose, CA (US)

(*) Notice: Subject to any disclaimer, the term of this patent is extended or adjusted under 35 U.S.C. 154(b) by 1237 days.

(21) Appl. No.: 13/470,278

(22) Filed: May 12, 2012

(65) Prior Publication Data

US 2013/0301680 A1    Nov. 14, 2013

(51) Int. Cl.
*G01K 7/01*    (2006.01)

(52) U.S. Cl.
CPC ..................... *G01K 7/01* (2013.01)

(58) Field of Classification Search
CPC .......................................... G01K 7/01
USPC ................ 327/291, 298, 211, 512
See application file for complete search history.

(56) References Cited

U.S. PATENT DOCUMENTS

| 6,870,357 B1* | 3/2005 | Falik | G01K 15/00 324/71.5 |
| 7,880,459 B2* | 2/2011 | Harvey | G05F 3/30 323/313 |
| 2006/0193370 A1* | 8/2006 | St. Pierre | G01K 7/01 374/178 |
| 2008/0095213 A1* | 4/2008 | Lin et al. | G01K 7/015 374/170 |
| 2009/0296780 A1* | 12/2009 | Lee | G01K 7/01 374/178 |

* cited by examiner

*Primary Examiner* — Lisa Caputo
*Assistant Examiner* — Janice M Soto
(74) *Attorney, Agent, or Firm* — Parris Corporation (57) ABSTRACT

Temperature accuracy is improved, conversion gain is increased without increasing current density and parasitic resistance errors and other problems with conventional bandgap reference temperature sensors are eliminated by generating a signal proportional to temperature from four samples, where the signal is defined as a difference between a first difference and a second difference, the first difference comprising a difference between the second sample and the first sample, the second difference comprising a difference between the fourth sample and the third sample, and where the signal is defined to cancel parasitic components in the first, second, third and fourth samples.

20 Claims, 4 Drawing Sheets

TEMPERATURE DETECTION METHOD AND DEVICE WITH IMPROVED ACCURACY AND CONVERSION TIME

TECHNICAL FIELD

The present invention generally relates to temperature detection. More particularly, the invention pertains to temperature sensors, sensor stimulation, sensor sampling and sample processing to obtain a signal proportional to temperature.

BACKGROUND

Temperature sensors are widely used in instrumentation and control systems, e.g., to monitor thermal conditions. There are a variety of types of temperature sensors, such as thermistors, resistance temperature detectors (RTDs), thermocouples and Silicon PN junction sensors. An advantage of a Silicon PN junction sensor is that it is easily integrated with Silicon circuitry that processes sensor signals, such as an analog to digital converter (ADC) and voltage to temperature converter. This integration improves the accuracy and cost of a temperature detector system. A bandgap reference temperature sensor is a type of Silicon PN junction sensor.

Conventional temperature measurement is implemented by applying a different current density to one or two pn junctions or diodes, e.g., diode coupled transistors. One current density divided by the other provides a current density ratio. This develops two different voltages across the pn junction(s), which results in a voltage change or delta ($\Delta$), e.g., $\Delta$Vbe. Conventionally, different current densities are generated by applying different currents to one transistor or two transistors having the same size, applying the same current to two transistors having different sizes or a combination thereof.

Figure 1A:
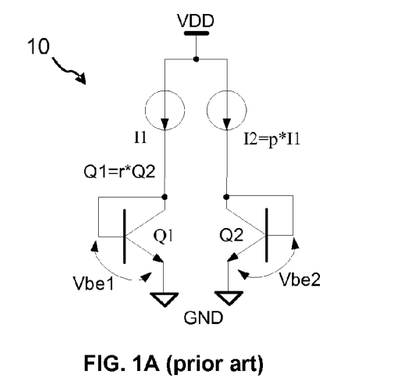
FIG. 1A illustrates an exemplary conventional temperature sensor.

FIG. 1A illustrates a conventional bandgap reference temperature detector. Conventional temperature detector 10 comprises a current source and a sensor. The current source is provided by first and second current sources I1, I2. The sensor is provided by first and second Bipolar Junction Transistors (BJTs) Q1 and Q2. Specifically, first and second BJTs Q1, Q2 are npn BJTs. First and second BJTs Q1, Q2 are diode-connected. The respective base and collector nodes of each of first and second BJTs Q1, Q2 are coupled together. The collector node of first BJT Q1 is coupled to first current source I1. The collector node of second BJT Q2 is coupled to second current source I2. The emitter nodes of first and second BJTs Q1, Q2 are coupled to ground.

As indicated in FIG. 1A, one technique to develop different current densities is an emitter size ratio r where the size of the emitter area of second BJT Q2 is r times the size of first BJT Q1. Providing the same current to transistors having different emitter sizes would result in different current densities. As indicated in FIG. 1A, another technique to develop different current densities is to have the magnitude of second current source I2 be p times the magnitude of first current source I1. Providing different currents to transistors having the same emitter size would result in different current densities. Both techniques may be implemented together. First and second current sources I1, I2 may be provided by Metal Oxide Semiconductor Field Effect Transistors (MOSFETs) powered by supply voltage VDD. As a result of generating different current densities in first and second BJTs Q1, Q2, two different voltages, i.e., Vbe1 and Vbe2, are generated and the difference between them is $\Delta$Vbe. This voltage is proportional to absolute temperature (PTAT).

The base to emitter voltages $V_{BE1}$, $V_{BE2}$ for respective first and second BJTs Q1, Q2 are given by equation 1.1:

$$V_{be} = \frac{nKT}{q} \ln\left(\frac{I}{I_S}\right) \qquad \text{Equation 1.1}$$

where n is an ideality factor of a pn junction diode, k is Boltzmann's constant, T is the temperature in Kelvins, q is the charge of an electron, I is the pn junction diode current, $I_S$ is the saturation current and ln is the natural logarithm function.

The difference $\Delta V_{BE}$ between base to emitter voltages $V_{BE1}$ and $V_{BE2}$ is given by equations 1.2, 1.3 and 1.4:

$$\Delta V_{be} = V_{be2} - V_{be1} \qquad \text{Equation 1.2}$$

$$\Delta V_{be} = \frac{nKT}{q} \ln\left(\frac{p*I1}{I_S}\right) - \frac{nKT}{q} \ln\left(\frac{I1}{r*I_S}\right) \qquad \text{Equation 1.3}$$

$$\Delta V_{be} = \frac{nKT}{q} \ln\left(\frac{p}{r}\right) \qquad \text{Equation 1.4}$$

The difference $\Delta V_{BE}$ between base to emitter voltages $V_{BE1}$ and $V_{BE2}$ is proportional to absolute temperature (PTAT). Accordingly, the junction voltage difference $\Delta V_{BE}$ is referred to as the PTAT voltage. If the current density ratio p/r were designed to be 8, at room temperature of 300 Kelvins, the difference $\Delta V_{BE}$ between base to emitter voltages $V_{BE1}$ and $V_{BE2}$ is approximately 53.7 mV according to Equation 1.4.

Figure 1B:
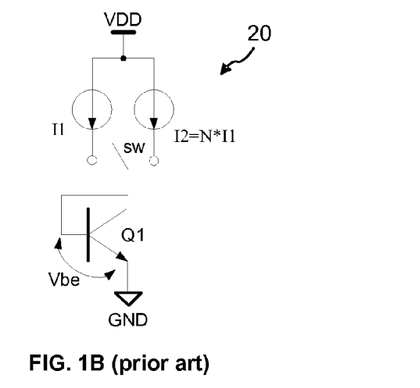
FIG. 1B illustrates an exemplary conventional temperature sensor.

FIG. 1B illustrates another conventional bandgap reference temperature detector. Conventional temperature detector 20 comprises a current source, a switch sw and a sensor. The current source is provided by first and second current sources I1, I2. The sensor is provided by a single BJT Q1. As indicated in FIG. 1B, the magnitude of second current source I2 is N times the magnitude of first current source I1. Providing different currents to single transistor Q1 will generate different current densities in single transistor Q1, where the current density ratio is N. Essentially, conventional temperature detector 20 eliminates second BJT Q2 in conventional temperature detector 10 and adds a switch sw. Single BJT Q1 is a diode coupled npn BJT. The base and collector nodes of single BJT Q1 are coupled together. The emitter node of single BJT Q1 is coupled to ground.

The collector node of single BJT Q1 is alternately coupled, e.g., via a switch, to first and second current sources I1, I2 to generate different current densities in single BJT Q1 having a current density ratio N. As a result of generating different current densities in single BJT Q1, two different voltages, i.e., Vbe1 and Vbe2, are generated and the difference between them is $\Delta$Vbe. This voltage is proportional to absolute temperature (PTAT).

The base to emitter voltages $V_{BE1}$, $V_{BE2}$ generated by single BJT Q1 in response to application of first and second currents I1, I2 are given by equation 1.1. The difference $\Delta V_{BE}$ between base to emitter voltages $V_{BE1}$ and $V_{BE2}$ is given by equations 1.2, 1.5 and 1.6:

$$\Delta V_{be} = \frac{nKT}{q} \ln\left(\frac{N*I1}{I_S}\right) - \frac{nKT}{q} \ln\left(\frac{I1}{I_S}\right) \qquad \text{Equation 1.5}$$

$$\Delta V_{be} = \frac{nKT}{q} \ln(N) \qquad \text{Equation 1.6}$$

Again, the difference $\Delta V_{BE}$ between base to emitter voltages $V_{BE1}$ and $V_{BE2}$ is proportional to absolute temperature (PTAT). Conventionally, an analog to digital converter (ADC) and a voltage to temperature converter would convert an analog PTAT, i.e., difference $\Delta V_{BE}$ between base to emitter voltages $V_{BE1}$ and $V_{BE2}$, to a digital temperature measurement.

There are a number of problems with conventional temperature detectors such as conventional temperature detectors 10 and 20. Generally, it is difficult to manufacture a highly accurate Silicon PN junction sensor because the PTAT voltage $\Delta V_{BE}$ is only tens of milliVolts (mV), there may be mismatch between first and second BJTs Q1, Q2, mismatch between first and second current sources I1, I2, e.g., FETs, and there may be a mismatch between other components, which results in mismatch in the design and actual current density ratio. These potential problems may cause several degrees of error in PTAT voltage $\Delta V_{BE}$. Generally, these and other problems require substantial post-processing (e.g. trimming, calibration circuitry) to correct conventional temperature output. In greater detail, although various embodiments may have more problems, five specific problems are addressed below.

First, equations 1.1-1.6 are for ideal performance of conventional temperature detectors 10 and 20. However, operation of their components is unlikely to be ideal. This may induce an error in PTAT voltage $\Delta V_{BE}$. Accordingly adjustments may be necessary.

Second, the actual current density ratio between first and second BJTs Q1, Q2 may not be exactly the current density ratio that the design and equations 1.1-1.6 are based on. This may induce an error in PTAT voltage $\Delta V_{BE}$. Accordingly adjustments may be necessary.

Third, there may be a Beta $\beta$ (i.e. $I_c/I_b$) mismatch for first and second BJTs Q1, Q2 at different current densities. Biasing points must be carefully selected in order to render Beta factors negligible. Of course this is difficult to accomplish and adjustments may be necessary.

Fourth, mismatch in the designed and actual ratio of first and second current sources I1, I2 may cause actual bias currents in first and second BJTs Q1, Q2 to be different than designed. Such an error would mean the actual current density ratio is something other than what it was designed to be, which would result in an error in PTAT voltage $\Delta V_{BE}$. Accordingly adjustments may be necessary.

Fifth, parasitic resistance exists between terminals and components. For example, a parasitic resistance is in series with collector and emitter nodes of the PN junction diodes of first and second BJTs Q1, Q2. Parasitic resistance may include, for example, terminals, traces and wires in circuit paths within and between integrated circuits and boards. The detected junction voltage $V_{BE}$ always includes voltage across parasitic resistance. This may induce an error in PTAT voltage $\Delta V_{BE}$. Accordingly adjustments may be necessary.

Figure 2:
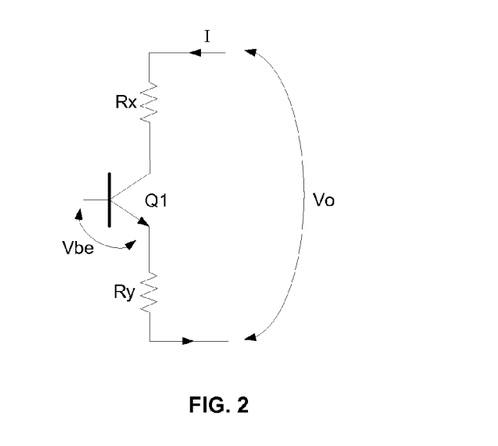
FIG. 2 illustrates the problem of parasitic resistance causing errors in temperature measurement systems.

FIG. 2 illustrates the problem of parasitic resistance causing errors in temperature measurement systems. Cumulative parasitic resistance is shown in series as parasitic resistor Rx coupled to the base and collector nodes of BJT Q1 and as parasitic resistor Ry coupled to the emitter node of BJT Q1. Rather than pn junction voltage Vbe being amplified and processed to determine a temperature measurement, total voltage Vo is amplified and processed to determine a temperature measurement. When stimulus current I1 flows through BJT Q1 and parasitic resistors Rx and Ry total voltage Vo is given by Equations 2.1 and 2.2.

$$Vo = \Delta V_{BE} + I1(N-1)(Rx + Ry) \qquad \text{Equation 2.1}$$

$$Vo = \frac{nKT}{q}\ln(N) + I1(N-1)(Rx + Ry) \qquad \text{Equation 2.2}$$

As indicated in Equations 2.1 and 2.2, cumulative parasitic resistances Rx and Ry will cause errors in voltage and in temperature determined from such erroneous voltage levels. Every Ohm of parasitic resistance could cause a temperature measurement error of 0.7 degrees Celsius. A further problem is that cumulative parasitic resistance is not constant and may vary with fluctuations in temperature. Therefore, corrections during subsequent processing are difficult and unreliable.

These problems are typical in conventional temperature detectors. With so many adjustments necessary to compensate for so many sources of errors, such as non-ideal components and non-ideal performance, it is inevitable that conventional temperature output will contain errors. Thus, there is a need for a temperature detection technique that eliminates or reduces the impact of common sources of error.

SUMMARY

This Summary is provided to introduce concepts in a simplified form. These concepts are described in greater detail below in the sections with accompanying figures entitled Detailed Description Of Illustrative Embodiments, Brief Description of the Drawings, Claims and in FIGS. 2-7. This Summary is not intended to identify key or essential features of the described or claimed subject matter, nor limit the scope thereof.

Temperature accuracy is improved, conversion gain is increased without increasing current density and parasitic resistance errors and other problems with conventional bandgap reference temperature sensors are eliminated by generating a signal proportional to temperature from four samples, where the signal is defined as a difference between a first difference and a second difference, the first difference comprising a difference between the second sample and the first sample, the second difference comprising a difference between the fourth sample and the third sample, and where the signal is defined to cancel parasitic components in the first, second, third and fourth samples.

A device in accordance with an embodiment of the invention may comprise, for example, a signal generator that generates a signal proportional to temperature from first, second third and fourth samples of a temperature sensor, where the signal is defined as a difference between a first difference and a second difference, the first difference comprising a difference between the second sample and the first sample, the second difference comprising a difference between the fourth sample and the third sample, and where the signal is defined to cancel parasitic components in the first, second, third and fourth samples. The signal generator adjusts the magnitude of at least one of the samples to cancel parasitic components. For example, considering a first stimulus set comprising the first and second stimulus and a second stimulus set comprising the third and fourth stimulus, where the first stimulus has a magnitude I, the second stimulus has a magnitude N*I, the third stimulus has a magnitude M*I and the fourth stimulus has a magnitude M*N*I, the intra-set ratio or magnitude of difference N and the inter-set ratio or magnitude of difference M between the first and second stimulus sets may be selected to cancel parasitic components.

A sampler may sample a temperature sensor to generate a set of samples comprising first, second, third and fourth samples. A temperature sensor may comprise a fixed or variable sensor, such as a single transistor that generates a first, second, third and fourth response in response to being stimulated. A stimulator may be fixed or variable, such as a reconfigurable stimulator that, in a first, second, third and fourth configuration, generates the first, second, third and fourth stimulus. Many different sample processing techniques may be employed, such as sampling first, second, third and fourth samples to first, second, third and fourth capacitors having first, second, third and fourth magnitudes followed by processing, such as differential integration and analog to digital conversion. Stimulation, sampling and processing to a temperature measurement may be completed in one cycle of an analog to digital converter (ADC).

A method in accordance with an embodiment of the invention may comprise, for example, sampling a temperature sensor to generate first, second, third and fourth samples and generating a signal proportional to temperature from the first, second, third and fourth samples, where the signal is defined as a difference between a first difference and a second difference, the first difference comprising a difference between the second sample and the first sample, the second difference comprising a difference between the fourth sample and the third sample, and where the signal is defined to cancel parasitic components in the first, second, third and fourth samples. One or both a temperature sensor and a temperature sensor stimulator may be fixed or variable, e.g., reconfigurable into a first, second, third and fourth configuration. Each stimulus may be the same or may have a different magnitude. The magnitude of one or more of the first, second, third and fourth samples may be adjusted to cancel parasitic components. For example, the first, second, third and fourth samples may be sampled to capacitors having different magnitudes. Dynamic element matching (DEM) may be used to reconfigure a reconfigurable stimulator, temperature sensor, sampling capacitors, etc.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments of the present invention and, together with the description, further serve to explain the principles involved and to enable a person skilled in the relevant art(s) to make and use the disclosed technologies. However, embodiments of the invention are not limited to the specific implementations disclosed herein. Each figure represents a different embodiment rather than a different view of the same embodiment. Similarities between portions of embodiments are indicated by use of the same references for particular components.

DETAILED DESCRIPTION OF ILLUSTRATIVE EMBODIMENTS

Reference will now be made to embodiments of the invention, examples of which are illustrated in the accompanying drawings. While the technology will be described in conjunction with various embodiments, it will be understood that the embodiments are not intended to limit the present technology. On the contrary, the present technology is intended to cover alternatives, modifications, and equivalents, which may be included within the spirit and scope the various embodiments as defined herein, including by the appended claims. In addition, in the following detailed description, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the embodiments presented.

References in the specification to "embodiment," "example embodiment," or the like, indicate that the embodiment described may include a particular feature, structure, characteristic or step, but every embodiment may not necessarily include the particular feature, structure, characteristic or step. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

Unless specifically stated otherwise, terms such as "sampling," "latching," "determining," "selecting," "storing," "registering," "creating," "including," "comparing," "receiving," "providing," "generating," "associating," and "arranging", or the like, refer to the actions and processes of an electronic device that manipulates and transforms data represented as physical (electronic) quantities within the electronic device. The terms "logic," "function," "step," and the like refer to functionality that may be implemented by hardware (digital and/or analog) or a combination of hardware, software and/or firmware. Unless specifically indicated, described and claimed functionality may be implemented by hardware (digital and/or analog) or a combination of hardware, software and/or firmware. The term "programmable" and the like refer to functionality permitting definition or selection of functionality to vary performance of logic from one embodiment to the next, whether one-time or any number of times such as by reprogrammable functionality.

Certain terms are used throughout the following description and claims to refer to particular system components and configurations. As one skilled in the art will appreciate, various skilled artisans and companies may refer to a component by different names. The discussion of embodiments is not intended to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection or though an indirect electrical connection through other components, devices and connections. Furthermore, the term "information" is intended to refer to any data, instructions, or control sequences that may be communicated between components of a device. For example, if information is sent between two components, data, instructions, control sequences, or any combination thereof may be sent between the two components.

Figure 3:
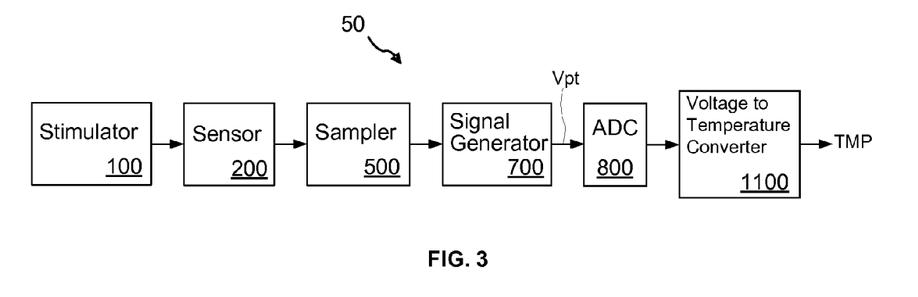
FIG. 3 illustrates a functional block diagram of an exemplary temperature detection system in accordance with an embodiment of the invention.
Figure 4:
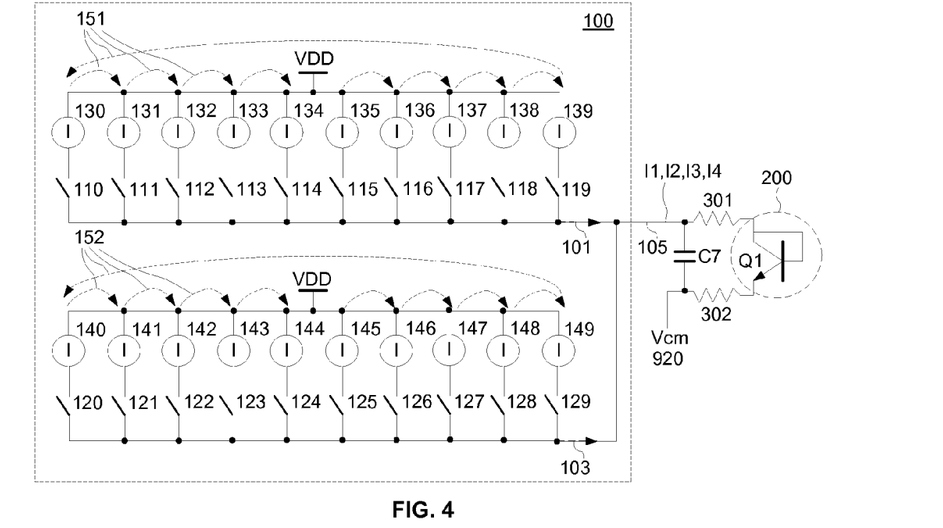
FIG. 4 illustrates an exemplary temperature detection system in accordance with an embodiment of the invention.
Figure 5:
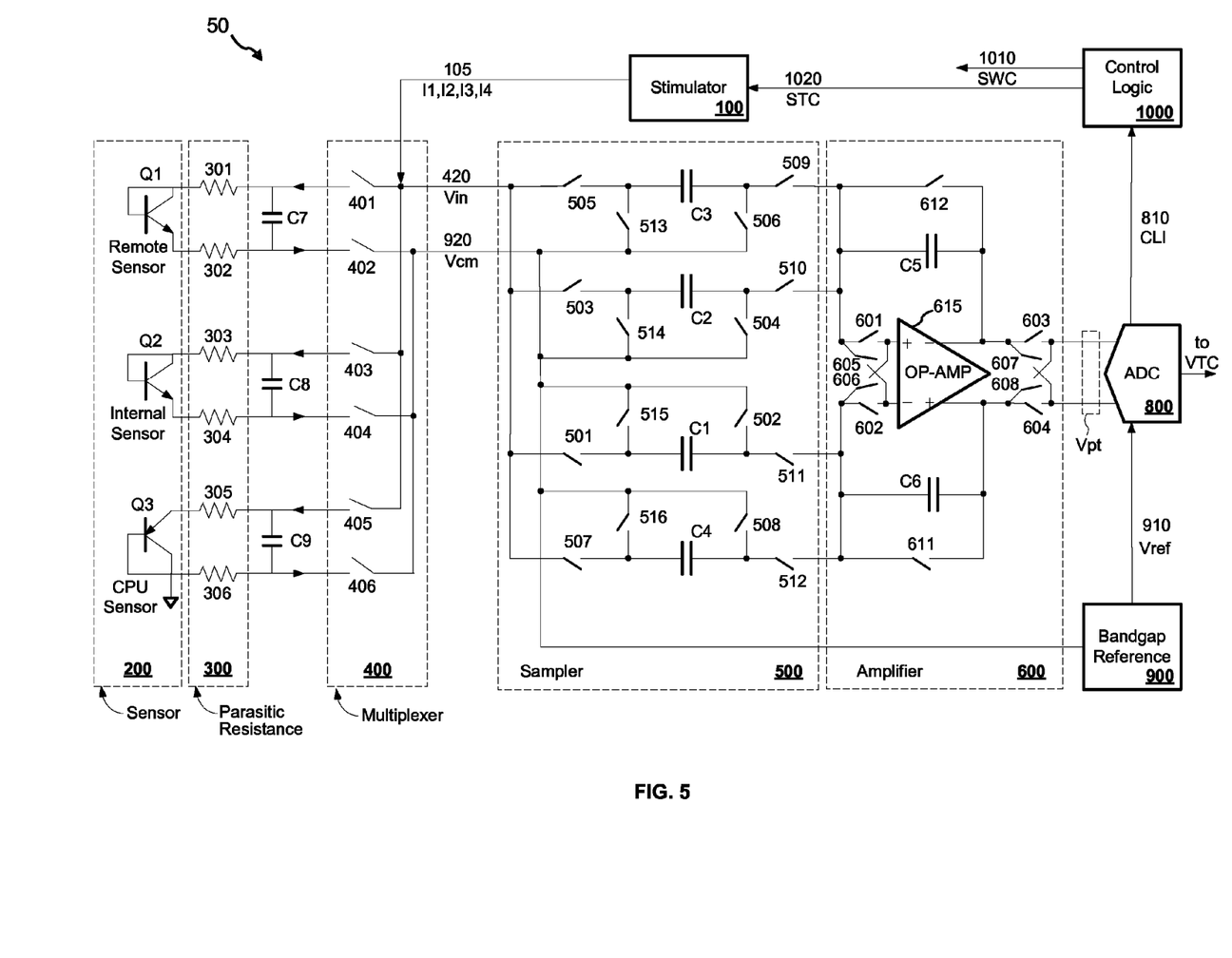
FIG. 5 illustrates an exemplary variable stimulator and fixed sensor in accordance with an embodiment of the invention.
Figure 6:
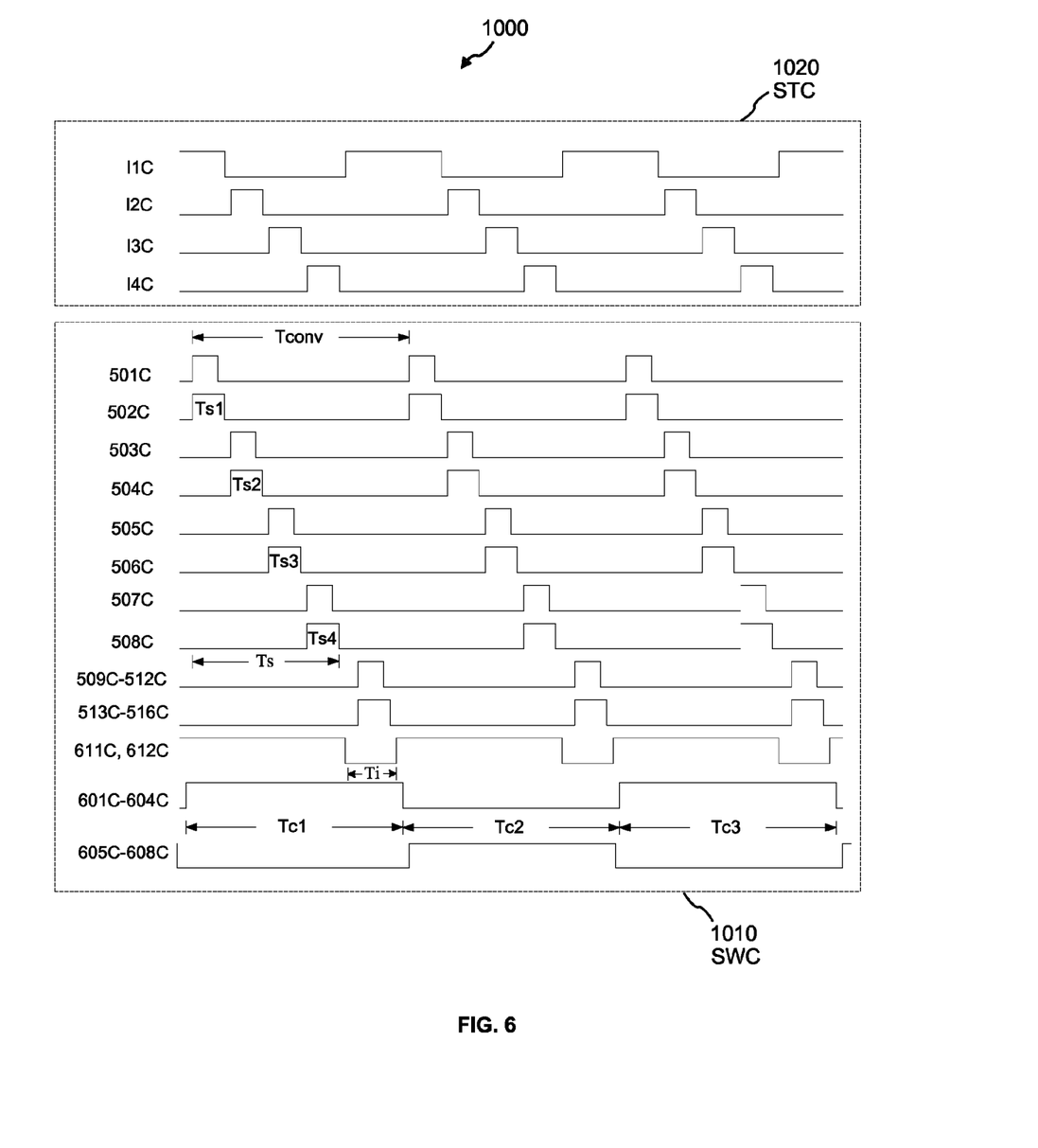
FIG. 6 illustrates exemplary control of exemplary temperature detection system components in accordance with an embodiment of the invention.
Figure 7:
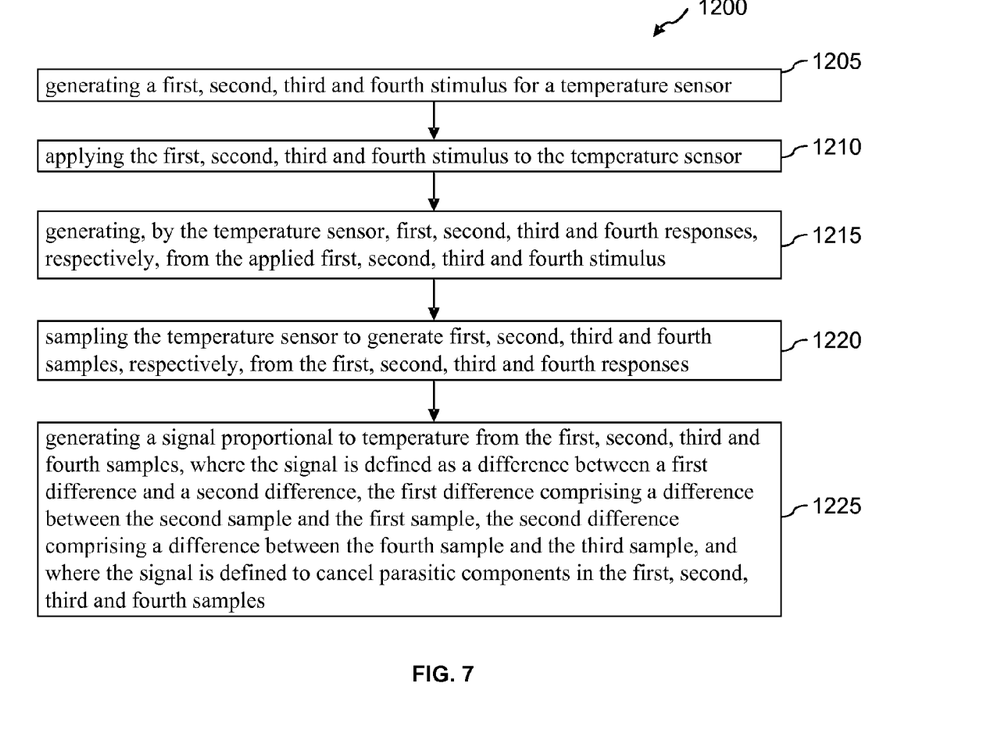
FIG. 7 illustrates an exemplary method of generating a signal proportional to temperature in accordance with an embodiment of the invention.

FIG. 3 illustrates a functional block diagram of an exemplary temperature detection system while FIGS. 4, 5 and 6 illustrate exemplary detailed embodiments of various functional blocks in FIGS. 3 and 4. FIG. 7 illustrates exemplary steps in an embodiment of the invention. Embodiments of the invention are not limited to the functional blocks, detailed examples, steps, order or the entirety of subject matter presented in the figures, which is why the figures are referred to as exemplary embodiments.

FIG. 3 illustrates a functional block diagram of an exemplary temperature detection system in accordance with an embodiment of the invention. Temperature detection system 50 comprises stimulator 100, sensor 200, sampler 500, signal generator 700, ADC 800 and voltage to temperature converter 1100. Sampler 500 may also be referred to as detector 500. Functional blocks may be implemented in hardware or a combination of hardware and software or firmware. Functional blocks may be analog, digital or a combination thereof.

Temperature detection system 50 is not intended to illustrate every functional block in every embodiment. Temperature detection system 50 is simply one of many possible embodiments. In other embodiments, there may be more or fewer blocks. Functional blocks presented in temperature detection system 50 may be reorganized, merged, separated, replaced, eliminated, etc. in various embodiments of the invention. For example, in some embodiments, stimulator 100 and sensor 200 may be merged in a temperature sensor. In other embodiments, functions in sampler 500 and signal generator 700 may be merged. Some functions of signal generation may be implemented in a sampling function. In some embodiments, some functions of signal generation and analog to digital conversion may be merged. Sampler 500, signal generator 700 and ADC 800 may be merged in a sigma-delta ADC having a sigma delta modulator with sampler. Thus, irrespective of particular blocks, embodiments of the invention may be implemented in one, several, all or alternative functional blocks.

Exemplary detection system 50 may implement method 1200 in FIG. 7. FIG. 7 illustrates an exemplary method of generating a signal proportional to temperature in accordance with an embodiment of the invention. Method 1200 comprises steps 1205-1225, although other embodiments may comprise more or fewer steps and the same or different steps. As illustrated in steps 1205 and 1210, stimulator 100 may generate and apply a first, second, third and fourth stimulus to a temperature sensor 200. As illustrated in step 1215, sensor 200 may generate first, second, third and fourth responses, respectively, from the applied first, second, third and fourth stimulus. As illustrated in step 1220, sampler 500 may sample the temperature sensor 200 to generate first, second, third and fourth samples, respectively, from the first, second, third and fourth responses. As illustrated in step 1225, signal generator 700 may generate a signal proportional to temperature from the first, second, third and fourth samples, where the signal is defined as a difference between a first difference and a second difference, the first difference comprising a difference between the second sample and the first sample, the second difference comprising a difference between the fourth sample and the third sample, and where the signal is defined to cancel parasitic components in the first, second, third and fourth samples. As indicated in FIG. 3, signal generator 700 generates a voltage proportional to temperature Vpt, which may be single-ended or differential. A signal proportional to temperature may be provided to ADC 800 for digital conversion followed by conversion to a temperature measurement TMP by voltage to temperature converter 1100.

Signal generator 700 may take many different forms in many different embodiments. An ADC is unnecessary if signal processing remains in the analog domain. For example, a voltage sample from a temperature sensor, e.g., sensor 200, can be sampled and held, e.g., by sampler 500, in one or more capacitors. In an analog signal generator 700, the sampled and held voltage can be used to generate a corresponding current, a current mirror could scale (multiply or divide) the current, an add/subtract circuit could sum the processed samples together, the resulting current could flow through a resistor to generate a PTAT voltage and a voltage to temperature converter, e.g., voltage to temperature converter 1100, could convert the PTAT voltage to a temperature. The point is that any temperature detection system component may be used that generates a signal proportional to temperature from first, second, third and fourth samples of a temperature sensor, where the signal is defined as a difference between a first difference and a second difference, the first difference comprising a difference between the second sample and the first sample, the second difference comprising a difference between the fourth sample and the third sample, and where the signal is defined to cancel parasitic components in the first, second, third and fourth samples.

Stimulator 100 may be fixed or variable, e.g., reconfigurable, and may comprise one or more stimulus generators, e.g., transistors, that generate a first, second, third and fourth stimulus. Regardless whether stimulator is fixed or reconfigurable into first, second, third and fourth configurations, each stimulus may be the same or different and may depend on the type of sensor 200 and the algorithm to generate a signal proportional to temperature. Sensor 200 may be fixed or variable, e.g., reconfigurable, and may comprise one or more transistors. In some embodiments, sensor 200 may comprise a single transistor that generates a first, second, third and fourth responses in response to being stimulated by a first, second, third and fourth stimulus. In other embodiments, sensor 200 may comprise a plurality of selectable transistors configurable into first, second, third and fourth configurations that generate first, second, third and fourth responses in response to being stimulated by a first, second, third and fourth stimulus. FIGS. 4 and 5 illustrate two of many embodiments of stimulator 100 and sensor 200.

Some problems with conventional temperature sensors may be reduced or eliminated by the choice of sensor 200, some problems may be eliminated by the choice of stimulator 100 and still other problems may be eliminated by the choice of stimulation and signal processing algorithm. Regarding selection of sensor 200, a temperature sensor comprising a single transistor may eliminate problems with conventional temperature sensors. As one example, there is no problem involving a mismatch between multiple transistors if sensor 200 comprises only one transistor.

Problems may also be eliminated by the choice of stimulator 100 to stimulate sensor 200. For example, avoiding the use of an op amp in the stimulator avoids offset caused by an op amp. Further, mismatch between multiple bias currents or failure to implement a particular bias current ratio in a processing algorithm may be reduced or eliminated by using a variable stimulator. A variable stimulator may comprise a plurality of selectable transistors, e.g., MOSFET current branches. Selecting among available current branches may dither, average or randomize mismatch between current branches to reduce or eliminate bias current mismatch.

Problems may also be eliminated by the choice of stimulation and signal processing algorithm. The stimulation and signal processing algorithm may reduce or eliminate parasitic resistance in temperature sensor junction voltage samples and may provide a higher conversion gain without increasing current density ratio. There may be tradeoffs between solutions to problems identified for conventional temperature sensors. For example, a high conversion gain, i.e., gain of temperature to junction voltage VBE, increases the accuracy of the signal proportional to temperature. A high conversion gain also reduces resolution requirements for an ADC to handle low magnitude signals. However, high conversion gain generally requires a high current density ratio, which can push transistor performance to the edges of ideal and into non-ideal territory. As a result, there could be amplification of nonlinearities in transistor temperature sensor performance, with the end result being reduced temperature detection accuracy. Once this occurs, equations and algorithms need to be manipulated to reflect device behavior and to correct errors. As will be seen, some embodiments of the invention permit a higher conversion gain without increasing the current density ratio.

Among other improvements, embodiments of the present invention reduce or eliminate the problem of parasitic resistance and parasitic components in temperature sensor samples, such as junction voltage $V_{BE}$. An exemplary stimulation, sampling and signal processing technique to reduce or eliminate such problems with conventional temperature sensors and detection systems is discussed next.

Unlike conventional temperature detection techniques, a voltage proportional to temperature Vpt may be defined as the difference between two differences, which may be adjusted to reduce or eliminate errors caused by parasitic resistance. Accordingly, a realization of first, second, third and fourth differences is an embodiment of a signal proportional to temperature, e.g., Vpt, generated from first, second, third and fourth samples (e.g. first sample $V_{BE1}$, second sample $V_{BE2}$, third sample $V_{BE3}$ and fourth sample $V_{BE4}$), where the signal is defined as a difference (e.g. third difference $\Delta V_{BE3}$) between a first difference (e.g. first difference $\Delta V_{BE1}$) and a second difference (e.g. second difference $\Delta V_{BE2}$), the first difference $\Delta V_{BE1}$ comprising a difference between the second sample $V_{BE2}$ and the first sample $V_{BE1}$, the second difference $\Delta V_{BE2}$ comprising a difference between the fourth sample $V_{BE4}$ and the third sample $V_{BE3}$. One or more samples and/or the first difference $\Delta V_{BE1}$, second difference $\Delta V_{BE2}$ and/or third difference $\Delta V_{BE3}$ may be adjusted to reduce or eliminate errors caused by parasitic resistance. Of course, this is only one of many possible embodiments.

FIG. 4 illustrates an exemplary variable stimulator and fixed sensor in accordance with an embodiment of the invention. In FIG. 4, sensor 200 comprises a fixed single transistor temperature sensor, which may, for example, be a remote sensor, internal sensor, CPU sensor, etc. In the embodiment shown in FIG. 4, sensor 200 comprises a single npn BJT Q1. BJT Q1 is diode-connected, which means the base and collector terminals are coupled together. Sensor 200 is accompanied by cumulative parasitic resistance, which is represented by series-coupled parasitic resistors 301, 302. Parasitic resistors 301, 302 are represented as parasitic resistors Rx and Ry in Equations 2.1 and 2.2. Noise filter capacitor C7 is coupled across BJT Q1 to filter noise, such as noise produced by switches in stimulator 100. A common mode voltage Vcm 920 is coupled to the emitter terminal of BJT Q1. Common mode voltage Vcm 920 may vary between embodiments. It may be fixed or variable.

Sensor Q1 is stimulated by stimulus 105, which is generated by stimulator 100. In this embodiment, stimulus 105 comprises first, second, third and fourth stimulus currents I1, I2, I3 and I4. For example, considering a first stimulus set comprising the first and second stimulus I1, I2 and a second stimulus set comprising the third and fourth stimulus I3, I4, where the first stimulus I1 has a magnitude I1, the second stimulus I2 has a magnitude N*I1, the third stimulus I3 has a magnitude M*I1 and the fourth stimulus I4 has a magnitude M*N*I1, where N comprises an intra-set ratio or magnitude of difference and M comprises an inter-set ratio or magnitude of difference between the first and second stimulus sets. Ratios M and N may be selected to cancel parasitic components.

Application of different stimulus currents to temperature sensor BJT Q1 will generate different junction voltages $V_{BE}$. For example, application of first, second, third and fourth stimulus currents I1, I2=N*I1, I3=M*I1 and I4=N*I3=N*M*I1, to temperature sensor BJT Q1 generate respective first, second, third and fourth junction voltages $V_{BE1}$, $V_{BE2}$, $V_{BE2}$ and $V_{BE4}$. A first difference $\Delta V_{BE1}=V_{BE2}-V_{BE1}$ and a second difference $\Delta V_{BE2}=V_{BE4}-V_{BE3}$ are given by Equations 4.1 and 4.2. However, parasitic components remain in first difference $\Delta V_{BE1}$ and second difference $\Delta V_{BE2}$.

$$\Delta V_{be1} = \frac{nKT}{q}\ln(N) + I_1(N-1)(Rx+Ry) \qquad \text{Equation 4.1}$$

$$\Delta V_{be2} = \frac{nKT}{q}\ln(N) + I_1 M(N-1)(Rx+Ry) \qquad \text{Equation 4.2}$$

A voltage proportional to temperature Vpt is given by Equations 4.3, 4.4 and 4.5, where the voltage proportional to temperature Vpt is a difference between the first and second differences adjusted to reduce or eliminate errors due to parasitic resistance in Equations 4.1 and 4.2. Voltage proportional to temperature Vpt may be proportional to absolute temperature (PTAT).

$$V_{pt} = \Delta V_{be3} = M * \Delta V_{be1} - \Delta V_{be2} \qquad \text{Equation 4.3}$$

$$V_{pt} = M[\ln(N) + I_1(N-1)(Rx+Ry)] - \left[\frac{nKT}{q}\ln(N) + I_1 M(N-1)(Rx+Ry)\right] \qquad \text{Equation 4.4}$$

$$V_{pt} = (M-1)\frac{nKT}{q}\ln(N) \qquad \text{Equation 4.5}$$

It may be observed that an adjustment to the magnitude of the first difference $\Delta V_{BE1}$ eliminates the parasitic components in the first difference $\Delta V_{BE1}$ and second difference $\Delta V_{BE2}$. More specifically, multiplying the first difference $\Delta V_{BE1}$ by the inter-set ratio M eliminates the parasitic components in the first difference and second difference. Thus, application of the inter-set ratio M to the first difference in Equation 4.3 leads to cancellation of parasitic resistance components in Equation 4.5. All that remains for the voltage proportional to temperature Vpt is a signal proportional to temperature. In other words, Vpt is dependent on temperature and independent of parasitic resistance.

In some embodiments, this sampling and signal processing technique may increase conversion gain without increasing current density, which avoids increasing non-linear performance of sensor BJTs and which reduces downstream processing requirements for other components, such as an ADC, to maintain accuracy.

For purposes of processing first, second, third and fourth responses, e.g., voltages, generated by sensor Q1, Equation 4.3 may be restated as Equations 4.6 and 4.7.

$$V_{pt} = M(V_{be2} - V_{be1}) - (V_{be} - V_{be3})$$ Equation 4.6

$$V_{pt} = (MV_{be2} + V_{be3}) - (MV_{be1} + V_{be4})$$ Equation 4.7

Equation 4.7 shows that implementation of this technique may involve collecting and processing four samples having particular magnitudes and polarities, i.e. first sample $V_{BE1}$ is multiplied by a magnitude of M with a negative polarity, second sample $V_{BE2}$ is multiplied by a magnitude of M and a positive polarity, third sample $V_{BE3}$ is multiplied by a magnitude of 1 with a positive polarity and fourth sample $V_{BE4}$ is multiplied by a magnitude of 1 with a negative polarity.

In some embodiments, the magnitude of voltage proportional to temperature Vpt may be too small to process relative to noise. In some embodiments Vpt may be approximately 55 mV to 80 mV for a temperature range of approximately 0° C. to 125° C. In order to obtain a higher signal to noise ratio (SNR), Vpt may be amplified, e.g., by a factor of A. In some embodiments, A may be 16, while in other embodiments it may be lower or higher. Gain may be divided amongst temperature detector (e.g. sampler, signal generator) gain and ADC gain, e.g., in a sigma delta modulator. Given amplification of 16, Vpt may be approximately 880 mV to 1,280 mV. In order to maintain an input to ADC that is 80% or less than full scale for better SNR, a reference voltage for the ADC may be 1,600 mV. Such amplification may be expressed in Equations 4.8 and 4.9.

$$V_{pt} = A[(MV_{be2} + V_{be3}) - (MV_{be1} + V_{be4})]$$ Equation 4.8

$$V_{pt} = AMV_{be2} + AV_{be3} - AMV_{be1} - AV_{be4}$$ Equation 4.9

A wide variety of embodiments may implement Equation 4.9. Some embodiments may be better than others. For example, first and second differences $\Delta Vbe1$, $\Delta Vbe2$ or first, second, third and fourth samples Vbe1, Vbe2, Vbe3, Vbe4 may be sequentially converted to digital form. A digital signal processor (DSP) may accomplish Equation 4.3 or Equation 4.9. There are several drawbacks to this method of processing samples. First, it takes longer, e.g., two or four ADC analog to digital conversions for each temperature measurement. Delays in a sigma-delta type ADC are particularly long. Doubling or quadrupling conversion time consumes more power and slows down temperature measurement. Second, because temperature measurement accuracy is closely dependent on the ratio of parasitic resistance and because temperature drifts and parasitic resistance may vary as temperature drifts during elapsed processing time, a longer processing cycle may result in errors. This may be especially true for sigma-delta ADCs due to their high resolutions. Other embodiments may accomplish temperature measurement in a single ADC processing cycle. For example, a switched capacitor structure may sample and integrate in one ADC cycle. A switched capacitor embodiment is illustrated in FIGS. 5 and 6.

As one of many embodiments that can generate first, second, third and fourth stimulus currents I1, I2, I3 and I4, FIG. 4 illustrates an exemplary variable stimulator embodiment of stimulator 100. Stimulator 100 comprises twenty current sources 130-149 selectable by twenty switches 110-129, which are shown separated into two banks of ten. The first bank is coupled to first bank node 101 and the second bank is coupled to second bank node 103. First and second bank nodes 101, 103 merge at the output 105 of stimulator 100. In this embodiment, each current source 130-149 is configured to generate current having magnitude I. There may be more or fewer current sources and switches in other embodiments.

Each of the twenty switches 110-129 may comprise, for example, CMOS switches or transmission gates. Other types of switches may be used in other embodiments. Each of the twenty switches 110-129 may comprise p-channel or n-channel FETs depending on the signal DC level, e.g., for high DC use PMOS, for low DC use NMOS.

Each of the twenty current sources 130-149 may comprise FETs. For example, each of the twenty current sources 130-149 may comprise one or more FETs coupled to power source VDD, to a constant current source (not shown) and to a first terminal of a respective one of the twenty switches 110-129. The magnitude and variability of power source VDD may also vary between embodiments. A constant current source may be used in some embodiments, but not others. Other types of current generators may be used in other embodiments. The second terminals of the twenty switches 110-119 are coupled together and to first bank node 101. The second terminals of the twenty switches 120-129 are coupled together and to second bank node 103.

In this embodiment, if one current source is selected, the current thru BJT Q1 is I. If two current sources are selected, the current thru BJT Q1 is 2I. If all 20 current sources are selected, the current thru BJT Q1 is 20I. The junction voltage $V_{BE}$ of BJT Q1 may be sampled for response of BJT Q1 to the application of each of first, second, third and fourth stimulus I1, I2, I3 and I4.

Accuracy may be improved by matching each of the twenty current sources 130-149. The impact of mismatches can be reduced by using dynamic element matching (DEM), e.g., by changing or shifting 151, 152 the current sources used to generate the first, second, third and fourth stimulus currents I1, I2, I3 and I4. Changing or shifting may be predetermined, random or a combination thereof to reduce or eliminate errors due to mismatch. FIG. 4 illustrates an embodiment where shifting 151, 152 is predetermined, sequential and looping within each of first and second banks of current sources. This has a dithering or averaging of errors due to mismatch. For example, if reconfiguration of current sources occurs at a rate of 20 kHz and temperature is recorded at a rate of once per second or 60 Hz, there should be little, if any, mismatch effect on temperature measurements.

Each of the 20 stimulator switches 110-129 is operated by a control signal. One embodiment of switch control is illustrated in FIG. 6, which shows an exemplary control timing diagram. Stimulator control STC 1020 shows first stimulus current I1 control I1C, second stimulus current I2 control I2C, third stimulus current I3 control I3C and fourth stimulus current I4 control I4C. Stimulator control STC 1020 shows a four phase control. Assuming first stimulus current I1 is the smallest current, first stimulus current I1 control I1C is provided with a longer duty cycle than other stimulus current controls. According to the illustrated embodiment, variable stimulator 100 is configured to consecutively and repetitiously apply to fixed sensor 200, first, second, third and fourth stimulus currents I1, I2, I3 and I4.

The particular switches selected by first, second, third and fourth stimulator control signals I1C, I2C, I3C and I4C to generate each of the first, second, third and fourth stimulus currents I1, I2, I3 and I4 depends on the algorithm embodiment and whether and how DEM is implemented. In implementations using DEM, switch controls may by dynamic rather than static. For example, if the intra-set ratio N is 6 and the inter-set ratio M is 2, such that first, second, third and fourth stimulus currents I1, I2, I3 and I4 are, respectively, I, 6I, 2I and 12I, then one switch is turned on to generate first stimulus current I1, two switches are turned on to generate second stimulus current I2, six switches are turned on to generate third stimulus current I3 and twelve switches are turned on to generate fourth stimulus current I4. The current density ratio developed in BJT Q1 by first, second, third and fourth stimulus currents would be 12:1. As one of many examples of the foregoing ratios, first, second, third and fourth stimulus currents I1, I2, I3 and I4 may be, respectively, 5 µA, 30 µA, 10 µA and 60 µA. Of course, the stimulus and current density may vary between embodiments. For example, in another embodiment, the intra-set ratio N may be 10 and the inter-set ratio M may be 2, such that first, second, third and fourth stimulus currents I1, I2, I3 and I4 are, respectively, I, 10I, 2I and 20I. As one of many examples of these ratios, first, second, third and fourth stimulus currents I1, I2, I3 and I4 may be, respectively, 5 µA, 50 µA, 10 µA and 100 µA.

An alternative to the combination of a variable stimulator and a fixed sensor illustrated in FIG. 4 is a fixed stimulator and variable sensor in accordance with an embodiment of the invention. A variable sensor may comprise a plurality of BJTs selectable by a plurality of sensor switches to generate first, second, third and fourth sensors to generate first, second, third and fourth responses to stimulation by one or more constant or variable stimuli. Each combination of sensor and stimulus in a cycle may be a different current ratio. For example, a fixed current applied to a first, second, third and fourth sensor comprising one, two, six and twelve BJTs splitting the fixed current will develop different current densities and will generate different junction voltages. In order to maintain a lower current I, as opposed to a higher current 12I, in a fixed stimulator, the emitter area of the BJTs may be one-twelfth (¹⁄12th) the size of the emitter area of BJT Q1 in fixed sensor 200 to increase the current density generated by lower current I. A current I will generate a current density of 12I if emitter area is ¹⁄12th the size.

The junction voltage $V_{BE}$ of each of first, second, third and fourth sensor may be sampled for response to the application of each of first, second, third and fourth stimulus I1, I2, I3 and I4, which may be the same or different depending on the algorithm. Each switch may comprise, for example, CMOS switches or transmission gates. Similar to the embodiment in FIG. 4, the impact of mismatches in BJTs can be reduced by using dynamic element matching (DEM), e.g., by rotating the controls for switches selecting BJTs.

There are numerous alternative embodiments for stimulator 100 and sensor 200, including a combination of the embodiments presented in FIG. 4 and alternately, such as where both stimulator 100 and sensor 200 are variable. Such an embodiment may use DEM to select stimulator elements and sensor elements. In other embodiments both stimulator 100 and sensor 200 may be fixed. For example four different sensors may each be biased with four stimulus currents, which may be the same or different depending on the sensors and the algorithm.

FIG. 5 illustrates an exemplary temperature detection system while FIG. 6 illustrates exemplary control thereof in accordance with an embodiment of the invention. Temperature detection system 50 in FIG. 5 and control timing diagram illustrated in FIG. 6 present an embodiment of temperature detection system 50 in FIG. 3 and the method in FIG. 7 in accordance with the foregoing stimulus, sampling and signal processing algorithm discussed relative to FIG. 4. It is important to understand that these are only a few of many embodiments. Stimulation ratios, current density ratios, sampling and signal processing, component values, etc. may vary between embodiments.

Temperature detection system 50 may be implemented in an unlimited number of systems. As some examples, temperature detection system 50 may be implemented in a desktop computer, laptop computer, handheld devices such as cellular telephones or any other system that utilizes temperature information.

Temperature detection system 50 comprises stimulator 100, sensor 200, parasitic resistance 300, multiplexer 400, sampler 500, amplifier 600, ADC 800, bandgap reference 900 and control logic 1000. For purposes of this embodiment, stimulator 100 comprises the embodiment illustrated in FIG. 4. Sensor 200 comprises remote sensor Q1, internal sensor Q2 and CPU sensor Q3. Parasitic resistance 300 comprises cumulative parasitic resistance shown as parasitic resistors 301 and 302 coupled to remote sensor Q1, parasitic resistors 303 and 304 coupled to internal sensor Q2 and parasitic resistors 305 and 306 coupled to CPU sensor Q3. External noise filter capacitors C7, C8 and C9 are coupled, respectively, to remote sensor Q1, internal sensor Q2 and CPU sensor Q3. Multiplexer 400 comprises switches 401-406. Sampler 500 comprises switches 501-516 and capacitors C1-C4. Amplifier 600 comprises op-amp 615, switches 601-612 and capacitors C5, C6. Control logic 1000 comprises logic to generate control signals for switches 501-516, 601-612 and to generate first, second, third and fourth stimulus control signals IC1-IC4.

Control logic 1000 controls the state of operation of temperature detection system 50 and the timing of operation of components therein. Control logic 1000 controls switches in stimulator 100, multiplexer 400, sampler 500 and amplifier 600. An embodiment of these controls is shown in FIG. 6. As illustrated in FIG. 6, control logic 1000 receives feedback from ADC 800. Control logic information CLI 810 provides digital information such as the voltage proportional to temperature to control logic 1000. Control logic 1000 generates stimulator control STC 1020 and switch control 1010. Stimulator control STC 1020 controls generation of first, second, third and fourth stimulus currents I1, I2, I3 and I4. First, second, third and fourth stimulus current controls I1C, I2C, I3C and I4C are illustrated as sequential and repetitive, although control may vary between embodiments. With the assumption that first stimulus current I1 has the smallest magnitude, the duty cycle of first stimulus current control I1C is provided with a longer duty cycle than other stimulus current controls. The controls, including duty cycle and order, may vary between embodiments. Switch control 1010 controls sampler switches 501-516 and amplifier switches 601-612 using sampler switch controls 501C-

516C and amplifier switch controls 601C-612C. Additional switches, such as switches 401-406 in multiplexer, may also be controlled by control logic 1000. Operation of sampler switches 501-516 and amplifier switches 601-612 is discussed during discussion of operation of sampler 500 and amplifier 600.

Bandgap reference 900 generates voltage reference Vref for ADC 800 and common mode voltage Vcm 920 for sensor 200 and sampler 500. In some embodiments, common mode voltage Vcm 920 may comprise a constant DC value with no AC component. Vref 900 may be generated by any known technique.

Stimulator 100 receives stimulator control STC 1020, i.e., first, second, third and fourth stimulus current controls I1C, I2C, I3C and I4C, from control logic 1000 to control generation of first, second, third and fourth stimulus currents I1, I2, I3 and I4, which are provided to sensors in sensor 200 though operation of switches 401-406 in multiplexer 400.

Sensor 200 comprises three sensors, i.e., remote sensor Q1, internal sensor Q2 and CPU sensor Q3, operating on three channels that may be utilized in parallel or serially. There may be more or fewer sensors in other embodiments. Each sensor may be on chip or off chip. An off-chip sensor, such as remote sensor Q1, senses temperature remote from sampler 500. An on-chip sensor, such as internal sensor Q2, senses temperature in physical vicinity to sampler 500. Some internal sensors, such as CPU sensor Q3, may be embedded in integrated circuits, such as CPUs, graphics processors, and other integrated circuits or systems that monitor and utilize temperature, e.g., to issue alerts or control operation.

Remote sensor Q1 and internal sensor Q2 are diode coupled npn BJTs while CPU sensor Q3 comprises a pnp BJT. Each node of each sensor may be coupled to parasitic resistance that causes errors in sensor measurements. The collector node of remote sensor Q1 is coupled to a first node of parasitic resistor 301. The emitter node of remote sensor Q1 is coupled to a first node of parasitic resistor 302. The collector node of internal sensor Q2 is coupled to a first node of parasitic resistor 303. The emitter node of internal sensor Q2 is coupled to a first node of parasitic resistor 304. The collector node of CPU sensor Q3 is coupled to ground GND. The emitter node of CPU sensor Q3 is coupled to a first node of parasitic resistor 305. The base node of CPU sensor Q3 is coupled to a first node of parasitic resistor 306. Of course parasitic resistors 301-306 are not component resistors; they merely represent cumulative resistance in wires, traces, etc.

External noise filter capacitor C7 is coupled between the collector and emitter nodes of remote sensor Q1. External noise filter capacitor C8 is coupled between the collector and emitter nodes of internal sensor Q2. External noise filter capacitor C9 is coupled between the base and emitter nodes of CPU sensor Q3. External noise filter capacitors C7, C8 and C9 filter noise from switches for sensor 200.

Multiplexer 400 selects one of three channels of sensor 200 by selectively coupling stimulator 100 and sampler 500 to a sensor in sensor 200. Multiplexer 400 selects which sensor will be stimulated by stimulator 100 and will provide a response to be sampled by sampler 500. Multiplexer 400 is controlled by switch control SWC 1010, which is generated by control logic 1000. Although control is not shown in FIG. 6, switches 401, 402 are closed by SWC 1010 when remote sensor Q1 is being stimulated and sampled, switches 403, 404 are closed by SWC 1010 when internal sensor Q2 is being stimulated and sampled and switches 405, 406 are closed by SWC 1010 when CPU sensor Q3 is being stimulated and sampled. Switches 401, 403 and 405 couple stimulus 105 to remote sensor Q1, internal sensor Q2 and CPU sensor Q3. Switches 402, 404, 406 provide common mode voltage Vcm 920 to remote sensor Q1, internal sensor Q2 and CPU sensor Q3.

Sampler or detector 500 and amplifier 600 illustrate a switched capacitor embodiment that samples, holds and processes samples from sensor 200, all in one ADC conversion cycle. Sampler 500 comprises switches 501-516 and sampling capacitors C1-C4. Amplifier 700 comprises chopper stabilized (CHS) differential operational amplifier op-amp 615, cross-coupled capacitors C5, C6 and switches 601-612. Responses generated by each sensor may be sampled and held in sampling capacitors C1-C4. By selecting magnitudes and configuration of sampling capacitors C1-C4 in accordance with Equation 4.7, sampler 500 may also perform some processing functions. The magnitude of capacitors may multiply the magnitude of samples. Configuring sampling capacitors to couple to a positive or negative node of op-amp 615 may define the polarity of samples for processing in accordance with Equation 4.7.

Thus, temperature detection system 50 in FIG. 5 illustrates an embodiment where signal generator 700 in FIG. 3 is implemented in part by sampler 500 and in part by amplifier 600. This demonstrates that by selecting a configuration, components and values in sampler 500, sampler 500 may implement more than sampling responses generated by sensor 200. Of course, there are many alternative implementations that integrate sampler 500 and signal processor 700, such as a sigma-delta modulator with a sampler.

In accordance with Equation 4.9, the magnitude of sampling capacitors C1 and C2, respectively storing first and second samples Vbe1 and Vbe2, are A*M*C, the magnitude of sampling capacitors C3 and C4, respectively storing first and second samples Vbe3 and Vbe4, are A*C, and the magnitude of cross-coupled capacitors C5 and C6 is C, where C is a unit capacitance value. For example, in one embodiment where M=2, C=1.33 pF, C3=C4=5.32 pF, C1=C2=10.64 pF. Also, in accordance with Equation 4.9, sampling capacitors C1 and C4, respectively storing first and fourth samples Vbe1 and Vbe4, can be coupled to the negative input terminal of op-amp 615 and sampling capacitors C2 and C3, respectively storing second and third samples Vbe2 and Vbe3, can be coupled to the positive input terminal of op-amp 615. In this embodiment, accumulation, e.g., addition and subtraction, of the four components of Equation 4.9 is accomplished by amplifier 600. First and fourth samples Vbe1 and Vbe4 are accumulated in cross-coupled capacitor C6 and second and third samples Vbe2 and Vbe3 are accumulated in cross-coupled capacitor C5.

The actual sizes of capacitors will vary among embodiments depending on the algorithm and implementation of it in analog circuitry, digital circuitry or a combination thereof. All capacitors described herein may be implemented with a MOS capacitor, a metal-insulator-metal (MIM) capacitor, other integrated circuit technology capacitors or discrete capacitors.

Accuracy of temperature detection system 50 may be improved by closely matching capacitors. However, the impact of mismatches can be reduced by using dynamic element matching (DEM), e.g., by having smaller capacitors, e.g., size C or smaller, and selecting these smaller capacitors randomly or in a particular pattern to form capacitors having necessary magnitudes. DEM may dither, average or randomize mismatch between capacitors to reduce or eliminate errors caused by mismatches.

Regarding the architecture of the embodiment of sampler 500 shown in FIG. 5, a first node of switches 501, 503, 505 and 507 are coupled to sampling node 420, which, when coupled by multiplexer 400 to one of remote sensor Q1, internal sensor Q2 or CPU sensor Q3, receives a sample Vin. A second node of switches 501, 503, 505 and 507 is coupled, respectively, to a first node of sampling capacitor C1, C2, C3 or C4 and a second node of switch 515, 514, 513 or 516. A first node of switches 502 and 515, 504 and 514, 506 and 513, 508 and 516 is coupled to node 920, which is coupled to common mode voltage Vcm. A second node of each sampling capacitor C1, C2, C3 or C4 is coupled, respectively, to a second node of switch 502, 504, 506, 508 and to a first node of switch 511, 510, 509 and 512.

Regarding the architecture of the embodiment of amplifier 600 shown in FIG. 5, the second node of switches 509 and 510 are coupled together and to a first node of cross-coupled capacitor C5, a first node of switch 612 and a first node of input chopper switches 601, 605. The second node of switches 511 and 512 are coupled together and to a first node of cross-coupled capacitor C6, a first node of switch 611 and a first node of input chopper switches 602, 606. Second nodes of input chopper switches 601 and 606 are coupled to the positive input node of op-amp 615. Second nodes of input chopper switches 602 and 605 are coupled to the negative input node of op-amp 615. The second terminals of switch 612 and cross-coupled capacitor C5 are coupled together and to the negative output node of op-amp 615 and first nodes of output chopper switches 603, 607. The second terminals of switch 611 and cross-coupled capacitor C6 are coupled together and to the positive output node of op-amp 615 and first nodes of output chopper switches 604, 608. Second nodes of output chopper switches 603 and 608 are coupled to a first differential input to ADC 800. Second nodes of output chopper switches 604 and 607 are coupled to a second differential input to ADC 800. First and second differential inputs to ADC 800 constitute a differential version of voltage proportional to temperature Vpt. ADC 800 converts Vpt from a differential analog signal to a digital signal and provides it to voltage to temperature converter (VTC) 1100, which generates temperature measurement TMP.

Regarding chopper-stabilized op-amp 615, since frequency bandwidth is relatively low, a general operational amplifier with a low offset may suffice for op-amp 615, although requirements may vary between embodiments. The input reference offset of op-amp 615 may affect the accuracy of signal processing. Signal chopping may be implemented at the input and output of op-amp 615 to reduce the impact on accuracy. Chopping may be implemented by a set of switches, e.g., input and output chopper switches 601-608, to swap the input and output polarity of op-amp 615. Since both input and output polarity swap at the same time, any offset will change polarity and be canceled. The chopping frequency should be lower than the loop bandwidth in order to improve offset cancellation by averaging any offset in opposite polarities.

FIG. 6 illustrates exemplary control of exemplary temperature detection system components in accordance with an embodiment of the invention. The switched capacitor architecture and control implements stimulation, responses, sampling and processing of four samples with minimal elapsed time, minimal temperature drift-induced error in one ADC conversion cycle Tconv, although the conversion cycle may be longer or shorter in other embodiments. Although the conversion cycle frequency may vary between embodiments, in one embodiment, the frequency of the conversion cycle Tconv may be 50 kHz. In another embodiment, the frequency of the conversion cycle Tconv may be 6 kHz. As indicated by stimulator control STC 1020 and switch control 1010, during each of four sensing phases or time periods Ts1, Ts2, Ts3, Ts4 within a sensing time Ts, switches 509-516 are open to separate sampler 500 and amplifier 600, switches 611, 612 are closed to short cross-coupled capacitors C5, C6, and first set of chopper switches 601-604 and second set of chopper switches 605-608 toggle for each conversion cycle Tc1, Tc2, Tc3, etc. to cancel input offset voltage.

During operation, responses to stimulation of sensor 200 are sampled and held in capacitors having the proper magnitude and polarity for samples shown in Equation 4.9. In this embodiment, switches are held closed when switch controls are high. As indicated in FIGS. 5 and 6, during operation of a first phase when stimulator 100 provides first stimulus current I1 to stimulate one of remote sensor Q1, internal sensor Q2 or CPU sensor Q3 selected by multiplexer 400, switches 501 and 502 are closed. As a result, the selected sensor is stimulated with a first stimulus current I1 and a first sample $V_{BE1}$ is sampled to and held in first sampling capacitor C1. During first sampling time period Ts1, first sampling capacitor C1 is charged. The charge stored in first sampling capacitor C1 is given by Equation 6.1.

$$Q1=(Vbe1-Vcm)*C1 \qquad \text{Equation 6.1}$$

When common mode voltage is zero or ground, the charge stored in first sampling capacitor C1 is given by Equation 6.2.

$$Q1=Vbe1*C1 \qquad \text{Equation 6.2}$$

Switch 502 may be held closed longer than switch 501 to reduce errors in charging first sampling capacitor C1.

During operation of a second phase when stimulator 100 provides second stimulus current I2 to stimulate the selected sensor, switches 503 and 504 are closed. As a result, the selected sensor is stimulated with the second stimulus current I2 and a second sample $V_{BE2}$ is sampled to and held in second sampling capacitor C2. During the second sampling time period Ts2, second sampling capacitor C2 is charged. The charge stored in second sampling capacitor C2 is given by Equation 6.3.

$$Q2=(Vbe2-Vcm)*C2 \qquad \text{Equation 6.3}$$

When common mode voltage is zero or ground, the charge stored in second sampling capacitor C2 is given by Equation 6.4.

$$Q2=Vbe2*C2 \qquad \text{Equation 6.4}$$

Switch 504 may be held closed longer than switch 503 to reduce errors in charging second sampling capacitor C2.

During operation of a third phase when stimulator 100 provides third stimulus current I3 to stimulate the selected sensor, switches 505 and 506 are closed. As a result, the selected sensor is stimulated with the third stimulus current I3 and a third sample $V_{BE3}$ is sampled to and held in third sampling capacitor C3. During the third sampling time period Ts3, third sampling capacitor C3 is charged. The charge stored in third sampling capacitor C3 is given by Equation 6.5.

$$Q3=(Vbe3-Vcm)*C3 \qquad \text{Equation 6.5}$$

When common mode voltage is zero or ground, the charge stored in third sampling capacitor C3 is given by Equation 6.6.

$$Q3=Vbe3*C3 \qquad \text{Equation 6.6}$$

Switch 506 may be held closed longer than switch 505 to reduce errors in charging third sampling capacitor C3.

During operation of a fourth phase when stimulator 100 provides fourth stimulus current I4 to stimulate the selected sensor, switches 507 and 508 are closed. As a result, the selected sensor is stimulated with the fourth stimulus current I4 and a fourth sample $V_{BE4}$ is sampled to and held in fourth sampling capacitor C4. During the fourth sampling time period Ts4, fourth sampling capacitor C4 is charged. The charge stored in fourth sampling capacitor C4 is given by Equation 6.7.

$$Q4=(Vbe4-Vcm)*C4 \qquad \text{Equation 6.7}$$

When common mode voltage is zero or ground, the charge stored in fourth sampling capacitor C4 is given by Equation 6.8.

$$Q4=Vbe4*C4 \qquad \text{Equation 6.8}$$

Switch 508 may be held closed longer than switch 507 to reduce errors in charging fourth sampling capacitor C4.

After sampling time Ts, first, second, third and fourth sampling capacitors C1, C2, C3, C4 hold first, second, third and fourth samples Vbe1, Vbe2, Vbe3, Vbe4 in the form of first, second, third and fourth charges Q1, Q2, Q3, Q4. As previously noted, in accordance with Equation 4.9, the magnitude of sampling capacitors C1 and C2, respectively storing first and second samples Vbe1 and Vbe2, are A*M*C and the magnitude of sampling capacitors C3 and C4, respectively storing first and second samples Vbe3 and Vbe4, are A*C, where C is a unit capacitance value. Thus, the samples are ready to be accumulated, i.e., added and subtracted, according to Equation 4.9 in an integration phase.

During the integration phase time period Ti, switches 611, 612 are first opened by switch controls 611C, 612C to permit cross-coupled capacitors C5, C6 to charge. Then switches 513-516 are closed by switch controls 513C-516C to couple a first node of first, second, third and fourth sampling capacitors C1, C2, C3, C4 to Vcm 920, which is ground in this embodiment.

Also, switches 509, 510 are closed by switch controls 509C, 510C to couple a second node of second and third sampling capacitors C2, C3 to the positive input node of op-amp 615 and to cross coupled capacitor C5 while switches 511, 512 are closed by switch controls 511C, 512C to couple a second node of first and fourth sampling capacitors C1, C4 to the negative input node of op-amp 615 and to cross coupled capacitor C6. Switches 509-512 open before switches 513-516 open to reduce charging errors. Switches 611, 612 open last, after ADC 800 receives differential voltage proportional to temperature Vpt. During this integration phase, the charge accumulated on cross-coupled capacitors C5 and C6 is given by Equations 6.9 and 6.10.

$$Q5=Vp*C5=Vbe2*C2+Vbe3*C3 \qquad \text{Equation 6.9}$$

$$Q6=Vn*C6=Vbe1*C1+Vbe4*C4 \qquad \text{Equation 6.10}$$

Since the magnitude of the magnitude of sampling capacitors C1 and C2 is A*M*C, the magnitude of sampling capacitors C3 and C4 is A*C and the magnitude of cross-coupled capacitors C5 and C6 is C, where C is a unit capacitance value, the respective voltages across cross-coupled capacitors C5 and C6, i.e., positive voltage Vp across capacitor C5 and negative voltage Vn across capacitor C6, are given by equations 6.11 and 6.12.

$$Vp=A(M*Vbe2+Vbe3) \qquad \text{Equation 6.11}$$

$$Vn=A(M*Vbe1+Vbe4) \qquad \text{Equation 6.12}$$

The differential output of op-amp 615, i.e., voltage proportional to temperature Vpt in differential form, is given by equations 6.13 and 6.14.

$$Vpt=Vp-Vn \qquad \text{Equation 6.13}$$

$$Vpt=A[(M*Vbe2+Vbe3)-(M*Vbe1+Vbe4)] \qquad \text{Equation 6.14}$$

It will be observed that Equation 6.14 is the same as equations 4.8 and 4.9. ADC 800 converts Vpt from a differential analog signal to a digital signal and provides it to voltage to temperature converter (VTC) 1100, which generates temperature measurement TMP.

The foregoing stimulation, sampling and integration phases in one ADC conversion cycle Tconv continue as shown in FIG. 6. Due to chopping by a toggling operation of switches 601-604 and 605-608 by a toggling of switch controls 601C-604C and 605C-608C illustrated in FIG. 6, each successive conversion cycle Tc2, Tc3, etc. toggles connections of sampling capacitors between positive and negative input nodes of op-amp 615.

There are many design, cost and/or performance advantages provided by embodiments of the invention relative to conventional temperature detection components and systems. Temperature measurement time is reduced, temperature accuracy is improved, conversion gain may be increased without increasing current density and parasitic resistance errors and other problems with conventional bandgap reference temperature sensors may be eliminated by generating a signal proportional to temperature from four samples, where the signal is defined as a difference between a first difference and a second difference, the first difference comprising a difference between a second sample and a first sample, the second difference comprising a difference between a fourth sample and a third sample, and where the signal is defined to cancel parasitic components in the first, second, third and fourth samples. First, second, third and fourth samples may be sensed back-to-back sequentially without ADC cycle delays in order to reduce errors caused by temperature drift. Parasitic resistance may be cancelled out in only one ADC cycle rather than a plurality of cycles converting samples or the differences between samples before processing.

Problems with conventional temperature sensors may be reduced or eliminated by selecting stimulator, sensor and the sensor stimulation and signal processing algorithm. Some problems may be eliminated by the choice of sensor, some problems may be eliminated by the choice of stimulator and still other problems may be eliminated by the choice of stimulation and signal processing algorithm. Regarding selection of sensor, a temperature sensor comprising a single transistor may eliminate problems with conventional temperature sensors. As one example, there is no problem involving a mismatch between multiple transistors if sensor comprises only one transistor.

Problems may also be eliminated by the choice of stimulator to stimulate a sensor. For example, avoiding the use of an op amp in the stimulator avoids offset caused by an op amp. Further, mismatch between multiple bias currents or failure to implement a particular bias current ratio in a processing algorithm may be reduced or eliminated by using a variable stimulator. A variable stimulator may comprise a plurality of selectable transistors, e.g., MOSFET current branches. Selecting among available current branches may dither, average or randomize mismatch between current branches to reduce or eliminate bias current mismatch.

Problems may also be eliminated by the choice of stimulation and signal processing algorithm. The stimulation and signal processing algorithm may reduce or eliminate parasitic resistance in temperature sensor junction voltage samples and may provide a higher conversion gain without increasing current density ratio. Some embodiments of the invention permit a higher conversion gain without increasing the current density ratio.

While more than four samples may be taken and processed, the primary benefit of more than four samples would be to remove random mismatch errors. Randomizing or shifting elements such as transistors in the configuration of stimulator 100 and sensor 200 and capacitors in sampler 500 and amplifier 600, e.g., using DEM, may also remove random mismatch errors.

The foregoing represents only a few of many possible sampling and signal processing embodiments. Each embodiment illustrated and discussed herein, as well as many other embodiments within the scope of inventions disclosed herein, may be described in a variety of general and specific descriptions with or without using the exact description provided herein. The embodiments presented are not limiting. Rather, they are an introduction to many embodiments falling within the scope of the inventions described herein. A series of descriptions of embodiments of the inventions are provided below. Like the embodiments, these descriptions are not limiting. Rather, these descriptions are simply a few of many ways to generally and specifically describe embodiments within the scope of the inventions disclosed herein.

A method in accordance with an embodiment of the invention may comprise, for example, sampling a temperature sensor to generate first, second, third and fourth samples and generating a signal proportional to temperature from the first, second, third and fourth samples, where the signal is defined as a difference between a first difference and a second difference, the first difference comprising a difference between the second sample and the first sample, the second difference comprising a difference between the fourth sample and the third sample, and where the signal is defined to cancel parasitic components in the first, second, third and fourth samples.

Each of the temperature sensor and the temperature sensor stimulator may be fixed or variable, e.g., reconfigurable into a first, second, third and fourth configuration, in any combination thereof. Some embodiments may reconfigure a reconfigurable stimulator into a first, second, third and fourth configuration to generate a first, second, third and fourth stimulus; apply the first, second, third and fourth stimulus to the temperature sensor; and generate, by the temperature sensor, first, second, third and fourth responses, respectively, from the applied first, second, third and fourth stimulus, wherein sampling generates the first, second, third and fourth samples, respectively, from the first, second, third and fourth responses. Each of the first, second, third and fourth configuration of the reconfigurable stimulator may comprise a different number of transistors that respectively generate the first, second, third and fourth stimulus. A reconfigurable stimulator may use dynamic element matching (DEM) to reconfigure the reconfigurable stimulator. Each stimulus may be the same or may have a different magnitude compared to each other stimulus. If a first stimulus set comprises the first and second stimulus and a second stimulus set comprises the third and fourth stimulus, the first stimulus may have a magnitude I, the second stimulus may have a magnitude N*I, the third stimulus may have a magnitude M*I and the fourth stimulus may have a magnitude M*N*I, where N is an intra-set ratio between stimuli in a set and M is an inter-set ratio between the stimulus sets.

Some embodiments may reconfigure a reconfigurable temperature sensor into a first, second, third and fourth configuration to generate first, second, third and fourth responses to a first, second, third and fourth stimulus, wherein sampling generates the first, second, third and fourth samples, respectively, from the first, second, third and fourth responses. Each of the first, second, third and fourth configurations of the reconfigurable temperature sensor may comprise a different number of transistors that respectively generate the first, second, third and fourth responses. A reconfigurable sensor may use dynamic element matching (DEM) to reconfigure the reconfigurable sensor. The magnitude of one or more of the first, second, third and fourth samples may be adjusted to cancel parasitic components. For example, sampling a temperature sensor to generate a set of samples may comprise sampling the first, second, third and fourth samples to capacitors having different magnitudes. Dynamic element matching (DEM) may be used to reconfigure a reconfigurable stimulator, temperature sensor, sampling capacitors, etc. Sampling may be performed serially or in parallel, such as where there are multiple sensors.

A device in accordance with an embodiment of the invention may comprise, for example, a signal generator that generates a signal proportional to temperature from first, second, third and fourth samples of a temperature sensor, where the signal is defined as a difference between a first difference and a second difference, the first difference comprising a difference between the second sample and the first sample, the second difference comprising a difference between the fourth sample and the third sample, and where the signal is defined to cancel parasitic components in the first, second, third and fourth samples. A signal generator may adjust the magnitude of at least one of the first, second, third and fourth samples to cancel parasitic components, e.g., by multiplying a first or second difference to cancel parasitic components.

Some devices may comprise a sampler that samples a temperature sensor to generate a set of samples comprising first, second, third and fourth samples. Some devices may comprise a reconfigurable stimulator reconfigurable into a first configuration, a second configuration, a third configuration and a fourth configuration to generate, respectively, a stimulus comprising a first stimulus, a second stimulus, a third stimulus and a fourth stimulus; and a temperature sensor comprising a single transistor that generates a first response, a second response, a third response and a fourth response in response to being stimulated, respectively, by the first stimulus, the second stimulus, the third and the fourth stimulus, wherein the temperature sensor generates the first sample, the second sample, the third sample and the fourth sample, respectively, by sampling the first response, the second response, the third response and the fourth response. Some device may comprise a stimulator that generates a stimulus; and a reconfigurable temperature sensor reconfigurable into a first configuration stimulated by the stimulus, a second configuration stimulated by the stimulus, a third configuration stimulated by the stimulus and a fourth configuration stimulated by the stimulus to generate, respectively a first response, a second response, a third response and a fourth response, wherein the temperature sensor generates the first sample, the second sample, the third sample and the fourth sample, respectively, by sampling the first response, the second response, the third response and the fourth response. Some devices may comprise a first capacitor of a first magnitude that holds the first sample; a second capacitor of a second magnitude that holds the second sample; a third capacitor of a third magnitude that holds the third sample and a fourth capacitor of a fourth magnitude that holds the fourth sample, where the magnitudes may be the same or different. Some devices may comprise a differential amplifier or a differential integrator having a positive and a negative terminal, where the first, second, third and fourth capacitors are selectively coupled to one of the positive terminal and the negative terminal based on the definition of the signal.

A device, as defined herein, is a machine or manufacture as defined by 35 U.S.C. §101. A device may comprise, for example but not limited to, a circuit, stimulator, sensor, sampler, signal generator, voltage to temperature converter, temperature detector, temperature detection system, modulator, filter, amplifier, ADC, etc. Many embodiments may use different temperature sensor and sensor stimulating devices, such as, but not limited to, one or more of a BJT, heterojunction bipolar transistor (HBT), a metal oxide field effect transistor (MOSFET) device, metal semiconductor field effect transistor (MESFET) device or other transconductor or transistor technology device. Such alternative devices may require alternative configurations other than the configuration illustrated in embodiments presented herein.

Techniques described herein may be implemented in hardware (digital and/or analog hardware) or a combination of hardware, software and/or firmware. Techniques described herein may be implemented in one or more components. Embodiments of the invention may comprise computer program products comprising logic (e.g., in the form of program code or software as well as firmware) stored on any computer useable medium, which may be integrated in or separate from other components. Such program code, when executed in one or more processors, causes a device to operate as described herein. Devices in which embodiments may be implemented may include storage, such as storage drives, memory devices, and further types of computer-readable media. Examples of such computer-readable media include, but are not limited to, a hard disk, a removable magnetic disk, a removable optical disk, flash memory cards, digital video disks, random access memories (RAMs), read only memories (ROM), and the like. In greater detail, examples of such computer-readable media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable media may, for example, store computer program logic, e.g., program modules, comprising computer executable instructions that, when executed, provide and/or maintain one or more aspects of functionality described herein with reference to the figures, as well as any and all components, steps and functions therein and/or further embodiments of the present invention described herein.

Proper interpretation of subject matter described herein and claimed hereunder is limited to patentable subject matter under 35 U.S.C. §101. Subject matter described in and claimed based on this patent application is not intended to and does not encompass unpatentable subject matter. As described herein and claimed hereunder, a method is a process defined by 35 U.S.C. §101. As described herein and claimed hereunder, each of a circuit, device, converter, apparatus, machine, system, computer, module, media and the like is a machine and/or manufacture defined by 35 U.S.C. §101.

While the present invention has been described with respect to a limited number of embodiments, those skilled in the art will appreciate numerous modifications and variations there from. Embodiments have been presented by way of example only, and not limitation. It will be apparent to persons skilled in the relevant art(s) that various changes in form and details can be made therein without departing from the spirit and scope of the invention. The exemplary appended claims encompass embodiments and features described herein, modifications and variations thereto as well as additional embodiments and features that fall within the true spirit and scope of this present invention.

What is claimed:

1. A method comprising:
   sampling a temperature sensor to generate first, second, third and fourth samples respectively based on a first, second, third and fourth stimulus, where a difference between a first stimulus difference and a second stimulus difference is non-zero, the first stimulus difference comprising a difference between the second and first stimulus and the second stimulus difference comprising a difference between the fourth and third stimulus; and
   generating a signal proportional to temperature from the first, second, third and fourth samples, where the signal is defined as a difference between a first sample difference and a second sample difference, the first sample difference comprising a difference between the second sample and the first sample, the second sample difference comprising a difference between the fourth sample and the third sample, and where the signal is defined to cancel parasitic components in the first, second, third and fourth samples.

2. The method of claim 1, further comprising:
   reconfiguring a reconfigurable stimulator into a first, second, third and fourth configuration to generate the first, second, third and fourth stimulus; and
   applying the first, second, third and fourth stimulus to the temperature sensor;
   generating, by the temperature sensor, first, second, third and fourth responses, respectively, from the applied first, second, third and fourth stimulus, wherein sampling generates the first, second, third and fourth samples, respectively, from the first, second, third and fourth responses.

3. The method of claim 2, wherein reconfiguring the reconfigurable stimulator comprises using dynamic element matching (DEM) to reconfigure the reconfigurable stimulator.

4. The method of claim 2, wherein the first, second, third and fourth samples are provided separately and concurrently for generation of the signal proportional to temperature.

5. The method of claim 4, wherein each of the first, second, third and fourth configuration of the reconfigurable stimulator comprises a different number of transistors that respectively generate the first, second, third and fourth stimulus.

6. The method of claim 1, a first stimulus set comprising the first and second stimulus and a second stimulus set comprising the third and fourth stimulus, wherein the first stimulus has a magnitude I, the second stimulus has a magnitude N*I, the third stimulus has a magnitude M*I and the fourth stimulus has a magnitude M*N*I, where N is an intra-set ratio between stimuli in a set and M is an inter-set ratio between the stimulus sets.

7. The method of claim 1, further comprising:
reconfiguring a reconfigurable temperature sensor into a first, second, third and fourth configuration to generate first, second, third and fourth responses to the first, second, third and fourth stimulus, wherein sampling generates the first, second, third and fourth samples, respectively, from the first, second, third and fourth responses.

8. The method of claim 7, wherein reconfiguring the reconfigurable temperature sensor comprises using dynamic element matching (DEM) to reconfigure the reconfigurable temperature sensor.

9. The method of claim 7, wherein each of the first, second, third and fourth configuration of the reconfigurable temperature sensor comprises a different number of transistors that respectively generate the first, second, third and fourth responses.

10. The method of claim 1, wherein the first, second, third and fourth samples are held separately and concurrently.

11. The method of claim 1, further comprising:
adjusting the magnitude of at least one of the first, second, third and fourth samples to cancel parasitic components.

12. The method of claim 1, wherein sampling a temperature sensor to generate a set of samples comprises:
sampling the first sample to a first capacitor of a first magnitude;
sampling the second sample to a second capacitor of a second magnitude;
sampling the third sample to a third capacitor of a third magnitude; and
sampling the fourth sample to a fourth capacitor of a fourth magnitude.

13. The method of claim 12, further comprising:
forming first, second, third and fourth capacitors using dynamic element matching (DEM).

14. A device comprising:
a sampler that samples a temperature sensor to generate first, second, third and fourth samples responsive to a respective first, second, third and fourth stimulus, where a difference between a first stimulus difference and a second stimulus difference is non-zero, the first stimulus difference comprising a difference between the second and first stimulus and the second stimulus difference comprising a difference between the fourth and third stimulus; and
a signal generator that generates a signal proportional to temperature from the first, second, third and fourth samples, where the signal is defined as a difference between a first sample difference and a second sample difference, the first sample difference comprising a difference between the second sample and the first sample, the second sample difference comprising a difference between the fourth sample and the third sample, and where the signal is defined to cancel parasitic components in the first, second, third and fourth samples.

15. The device of claim 14, further comprising:
a reconfigurable stimulator reconfigurable into a first configuration, a second configuration, a third configuration to and a fourth configuration to generate, respectively, a stimulus comprising a first stimulus, a second stimulus, a third stimulus and a fourth stimulus; and
a temperature sensor comprising a single transistor that generates a first response, a second response, a third response and a fourth response in response to being stimulated, respectively, by the first stimulus, the second stimulus, the third stimulus and the fourth stimulus, wherein the temperature sensor generates the first sample, the second sample and the third sample, respectively, by sampling the first response, the second response, the third response and the fourth response.

16. The device of claim 14, further comprising:
a stimulator that generates a stimulus; and
a reconfigurable temperature sensor reconfigurable into a first configuration stimulated by the stimulus, a second configuration stimulated by the stimulus, a third configuration stimulated by the stimulus and a fourth configuration stimulated by the stimulus to generate, respectively a first response, a second response, a third response and a fourth response, wherein the temperature sensor generates the first sample, the second sample, the third sample and the fourth sample, respectively, by sampling the first response, the second response, the third response and the fourth response.

17. The device of claim 14, wherein the sampler comprises:
a first capacitor of a first magnitude that holds the first sample;
a second capacitor of a second magnitude that holds the second sample;
a third capacitor of a third magnitude that holds the third sample; and
a fourth capacitor of a fourth magnitude that holds the fourth sample.

18. The device of claim 17, wherein the signal generator comprises:
a differential integrator having a positive and a negative terminal, wherein the first, second, third and fourth capacitors are selectively coupled to one of the positive terminal and the negative terminal based on the definition of the signal.

19. A device comprising:
a signal generator that generates a signal proportional to temperature from first, second, third and fourth samples, respectively, in first, second, third and fourth capacitors, where the first and third capacitors have different magnitudes, where the signal is defined as a difference between a first difference and a second difference, the first difference comprising a difference between the second sample and the first sample, the second difference comprising a difference between the fourth sample and the third sample, and where the signal is defined to cancel parasitic components in the first, second, third and fourth samples.

20. The device of claim 19, wherein the signal generator adjusts the magnitude of at least one of the first, second, third and fourth samples to cancel parasitic components.

* * * * *